United States Patent [19]
Kulev et al.

[11] Patent Number: 6,043,175
[45] Date of Patent: *Mar. 28, 2000

[54] METHOD AND APPARATUS FOR PRODUCING A SILICON BASED BINDING COMPOSITION AND PRODUCT PREPARED THEREFROM

[75] Inventors: Gennady Ivanovich Kulev, Pskov; Leonid Glebovich Malinovski, Moscow; Ivan Pavloivich Shvarev, Loboya; Piotr Ravelevich Miroevsky, Moscow, all of Russian Federation

[73] Assignee: VKVS Worldwide Corporation, Miami, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/448,593
[22] PCT Filed: Dec. 8, 1993
[86] PCT No.: PCT/RU93/00295
§ 371 Date: Jul. 1, 1996
§ 102(e) Date: Jul. 1, 1996
[87] PCT Pub. No.: WO94/25162
PCT Pub. Date: Nov. 10, 1994

[30] Foreign Application Priority Data
Dec. 8, 1992 [RU] Russian Federation ............. 92010795

[51] Int. Cl.⁷ .................................................. C04B 35/16
[52] U.S. Cl. ......................... 501/154; 501/133; 106/638; 106/816
[58] Field of Search ..................... 501/133, 154; 106/638, 816

[56] References Cited

U.S. PATENT DOCUMENTS

| | | |
|---|---|---|
| 20,370 | 5/1858 | Rands . |
| 303,708 | 8/1884 | Coles . |
| 2,090,578 | 8/1937 | Eppenbach . |
| 2,492,808 | 3/1949 | Marisic et al. . |
| 2,741,600 | 4/1956 | Allen . |
| 2,856,268 | 5/1958 | Young . |
| 2,886,466 | 5/1959 | Iler et al. ............................. 252/313.2 |
| 2,992,930 | 7/1961 | Wheeler et al. ....................... 106/38.3 |

(List continued on next page.)

FOREIGN PATENT DOCUMENTS

| | | |
|---|---|---|
| 1314457 | 3/1963 | Canada . |
| 1038184 | 8/1980 | Canada . |
| 1298955 | 4/1992 | Canada . |
| 1038155 | 1/1993 | Canada . |
| 1150883 | 1/1958 | France . |
| 1069547 | 3/1989 | Japan . |
| 368880 | 5/1973 | U.S.S.R. . |
| 992487 | 1/1983 | U.S.S.R. . |
| 1204260 | 1/1986 | U.S.S.R. . |
| 1173694 | 12/1969 | United Kingdom . |

OTHER PUBLICATIONS

"The Power of Particles" by Franz Frisch, Lufthansa Bordbuch Feb. 1993, pp. 54–57.

Patent Office, Application for Patent No. 375156, filed Mar. 6, 1931, Orazio Rebuffat, inventor; entitled: "Use of Colloidal Silica for the Egglomeration of Incoherent Material, With the Object of Forming Blocks of Refractory Materials and Mortars to be used in Joining Them Together".

Patent Office, Application For Patent No. 464,047, filed May 29, 1939, P. W. Jones and J. W. Swezey, applicants; "Method Of Making Artifical Structural Material and Product".

Application for Patent No. 58,079, Oct. 1891, entitled "Pulverizer", Estate of Y. W. Seaver, Department of Agriculture, Patent Branch, Boston, Massachusetts.

*Primary Examiner*—Mark L. Bell
*Assistant Examiner*—David Sample
*Attorney, Agent, or Firm*—Baker & McKenzie

[57] ABSTRACT

Disclosed is a binding solution comprising silicon dioxide fines in an aqueous medium, the fines being substantially spherical in shape. The binding solution has a pH from about 9.5 to about 11. A grinder, which may be used to prepare the binding solution and a product, which may be prepared from the binding solution are also disclosed.

37 Claims, 9 Drawing Sheets

U.S. PATENT DOCUMENTS

| | | |
|---|---|---|
| 3,083,167 | 3/1963 | Shannon . |
| 3,103,316 | 9/1963 | Schaal . |
| 3,111,278 | 11/1963 | Buschman . |
| 3,215,355 | 11/1965 | Shouvlin et al. . |
| 3,434,672 | 3/1969 | Guin . |
| 3,459,380 | 8/1969 | Kartman . |
| 3,493,182 | 2/1970 | Szegvari . |
| 3,650,977 | 3/1972 | Bobb . |
| 3,652,214 | 3/1972 | Aboutboul et al. . |
| 3,709,664 | 1/1973 | Krekeler et al. . |
| 3,720,532 | 3/1973 | Simpson et al. . |
| 3,754,952 | 8/1973 | Kirilishin et al. ............... 106/636 |
| 3,902,673 | 9/1975 | Berggren . |
| 3,920,578 | 11/1975 | Yates ............................ 252/313.2 |
| 3,930,878 | 1/1976 | Mendoza . |
| 3,933,317 | 1/1976 | Rovere . |
| 3,959,174 | 5/1976 | Winyall et al. . |
| 4,216,113 | 8/1980 | Winyall . |
| 4,256,682 | 3/1981 | Denton . |
| 4,336,234 | 6/1982 | Leutner et al. . |
| 4,457,804 | 7/1984 | Reinhall . |
| 4,576,921 | 3/1986 | Lane . |
| 4,624,800 | 11/1986 | Sasaki et al. . |
| 4,881,348 | 11/1989 | Davis . |
| 4,915,870 | 4/1990 | Jones . |
| 4,925,647 | 5/1990 | Kirchhofer . |
| 4,999,325 | 3/1991 | Michael . |
| 5,110,769 | 5/1992 | Welsh et al. . |
| 5,116,535 | 5/1992 | Cochrane . |
| 5,145,692 | 9/1992 | Hereford . |
| 5,221,497 | 6/1993 | Watanabe et al. . |
| 5,238,518 | 8/1993 | Okubi et al. ........................ 501/133 |

METHOD AND APPARATUS FOR PRODUCING A SILICON BASED BINDING COMPOSITION AND PRODUCT PREPARED THEREFROM

FIELD OF THE INVENTION

This invention relates to the manufacture of silicon based binding compositions from silica. In particular, the invention relates to binding compositions which are prepared by the wet grinding of silica in an alkaline medium and products which may be prepared from the binding composition. In addition, this invention relates to the apparatus which may be used to prepare the binding composition.

BACKGROUND OF THE INVENTION

Ceramics may generally be defined as products manufactured by the action of heat on earthy raw materials in which silicon with its oxide and silicates occupy a predominant position. Various types of products are made from ceramics including structural clay products (such as brick, tile, terra cotta and glazed architectural brick); whitewares (such as dinnerware, chemical and electrical porcelain, sanitary ware and floor tile); glass products of all types; porcelain enamels; refractories; Portland cement, lime, plaster and gypsum products; abrasive materials such as fused alumina, silicon carbide and related products; and, aluminum silicate fibres.

Clay based ceramic products have become a staple in many areas of industry including the construction industry. In particular, structural clay products are used extensively in the construction of buildings.

Accordingly, one disadvantage of structural clay products is that an extensive amount of time is required to produce a single product. Further, large amounts of energy must be utilized during the baking process in the kiln. Typically, in order for a manufacturing plant to be economically efficient, kilns having a capacity to simultaneously bake a large quantity of bricks are required. In addition, manufacturing plants tend to be located near the source of the clay, thus increasing the cost of transporting the bricks to the construction site where they will be used.

More recently, silicate based material has been utilized to produce bricks. For example, calcium silicate bricks may be prepared by grinding lime together with sand to produce a lime-silica bonding adhesive, mixing this adhesive with sand, pressing the mixture of sand and bonding adhesive into a mold and baking the mixture in an autoclave. Calcium silicate bricks may be utilized in place of more conventional clay bricks in the construction industry.

One disadvantage with calcium silicate bricks is the amount of time required to produce a single brick. In addition, a large amount of processing equipment and power input is required to produce calcium silicate bricks.

Binding compositions have also been prepared by the wet grinding of sand in an alkaline medium. According to the method disclosed in U.S.S.R. Author's Priority Certificate No. 992487, sand is ground in a ball mill in an alkaline medium (pH 9.0–10.5) to produce a silica based binding composition. The feedstock is divided into three portions. The first portion, which comprises 50% of the feedstock of sand, is milled for 6 hours. In the presence of a waterglass having a pH of 10.5. The second portion, which comprises 25% of the initial feedstock, is then combined with the milled feedstock and the mixture is milled for 7 hours. The third portion, which comprises 25% of the initial feedstock, is added to this milled product and this mixture is then milled for an additional 12 hours. One disadvantage of this method is that each batch requires 24 hours of milling time. This reduces the potential throughput of the process. In addition, the lengthy grinding time increase the wear of the components of the ball mill and substantially decrease the lifetime of the ball mill. In addition, the product produced by this method may not have sufficient compressive strength for use in some applications.

SUMMARY OF THE INVENTION

According to the instant invention, a binding composition comprising silica is prepared by fractionating a silicon feedstock in the presence of an alkaline medium to produce fines that are substantially spherical in shape. The fines are surrounded by a layer of orthosilicic acid sol. Preferably, the binding solution has no or substantially no iron therein. The binding solution may contain from about 25 to about 0 ppm iron, more preferably from about 15 to about 0 and, most preferably, from about 10 to about 0 ppm iron.

The binding solution may be prepared by passing the silica through one or more grinders. Preferably, at least two grinders are utilized. In the first grinder, preliminary grinding of the silica feed material is undertaken and a dispersed mass of silica in an alkaline medium is formed. This dispersed mass is continuously fed into a second grinder where the silica particles are ground to the required level of fineness and the binding solution in produced. The grinding is conducted so as to shear the silicon dioxide and to achieve a high degree of fractionation of the silica particles so as to produce a highly uniform binding solution.

In accordance with the instant invention, the binding solution may be prepared in a grinder having first and second frusto conical sections. The second frusto conical section is coaxially mounted within the first frusto conical section. The second frusto conical section rotates relative to first frusto conical section. The binding solution is passed through the work zone between the first and second frusto conical sections. During its passage through this work zone, the silica is ground to the desired size. As will be appreciated by those skilled in the art, each grinder has an optimum size reduction of particles which may be achieved. Accordingly, depending upon the feed size of the feed material, one, two or more grinders may be required.

If more than one grinder is required, then the final grinder may have a plurality of conical spindles positioned in the working zone of the grinder. The apex of the conical spindles is positioned adjacent the discharge end of the grinder. The work zone of the grinder narrows from the entrance to the work zone to the discharge end of the work zone. The work zone narrows at a greater rate than the conical spindles. Accordingly, the apex of the conical spindles is in contact with the grinding surfaces of the first and second conical sections while the end of the conical spindles distal to the apex of the spindles will not be in contact with both of these surfaces. The conical spindles act as additional grinding surfaces to fracture the silica particles as they pass through the work zone.

One advantage of the instant invention is that a binding solution is prepared in a substantially shorter amount of time than has been achieved using a ball mill. In particular, a binding solution may be prepared in about one to two hours whereas approximately twenty-four hours have been required utilizing ball mills.

The binding solution of the instant invention may also be utilized to produce a finished product such as a brick. According to the process, the binding solution is intimately mixed with a filler. Preferably, the filler is sheared in the presence of the binding solution such as by passing the filler and binding solution through a grinder similar to the final grinder described above wherein the spindles have been removed. The prepared mixture is then compacted into a mould and cured. By varying the filler or mixture of fillers, a variety of products having a wide range of performance characteristics including high compressive strength, high yield strength, good acid resistance, low thermal conductivity, good acoustical insulation properties and good resistance to degradation after repeated freeze thaw cycles may be produced.

A further advantage of the instant invention is that the products produced utilizing the binding solution of the instant invention have a higher compressive strength and a lower porosity than similar products manufactured using binding solutions prepared in ball mills. In particular, the cured product may have a compressive strength of from about 800 to about 1000 Kg/cm$^2$ as opposed to 200 to about 250 Kg/cm$^2$ which has been achieved using binding solutions prepared from ball mills.

BRIEF DESCRIPTION OF THE DRAWINGS

These and other advantages of the invention will be more fully and completely explained by reference to the following drawings of a preferred embodiment of the invention in which.

DESCRIPTION OF THE PREFERRED EMBODIMENT

Figure 1:
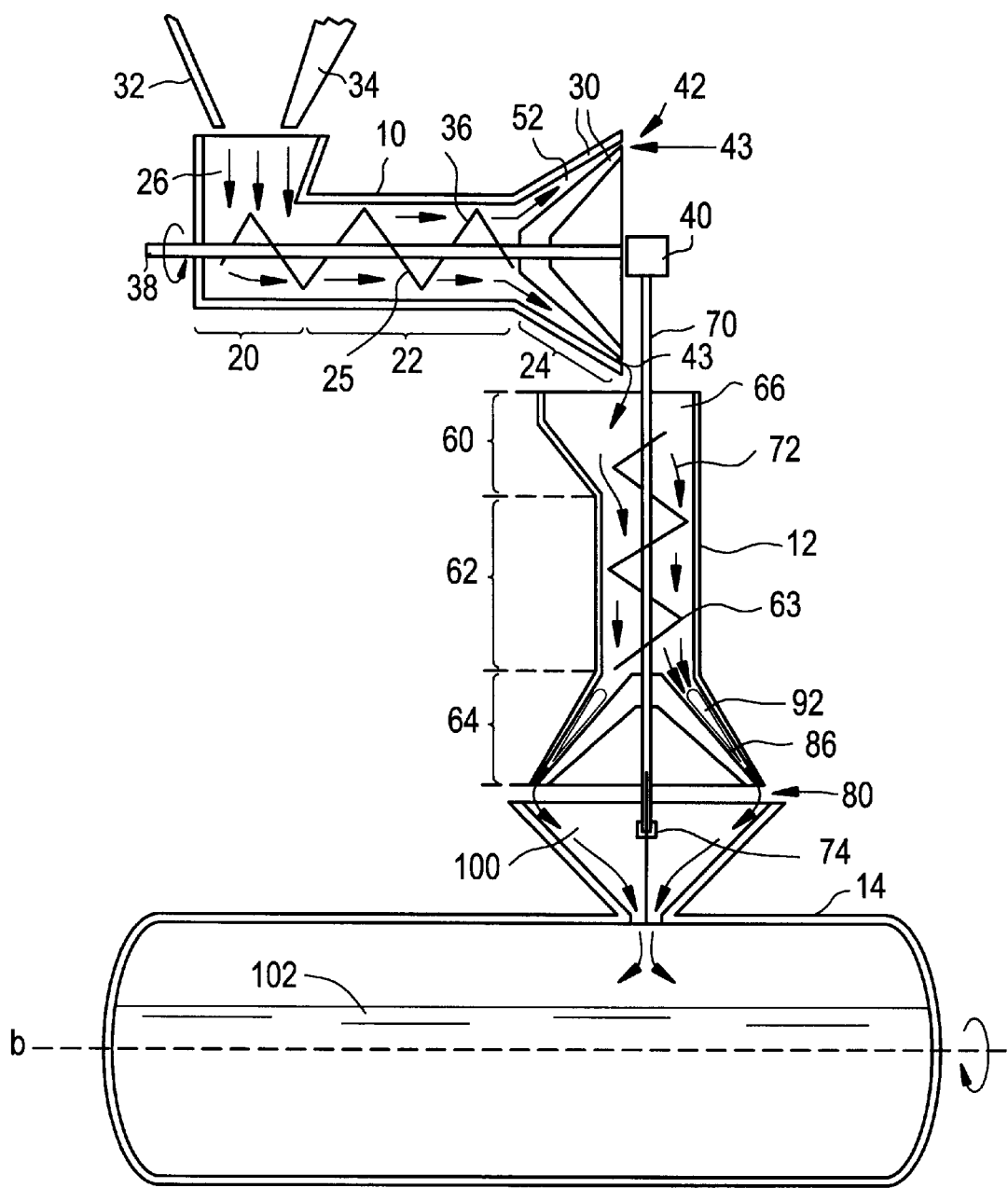
FIG. 1 is schematic of a process to produce the binding solution of the instant invention.

As shown in FIG. 1, a production line for the preparation of the binding solution comprises first grinder 10, second grinder 12 and stabilization tank 14. First grinder 10 may have three zones generally referred to as hopper zone 20, mixing zone 22, and grinding zone 24. Hopper 26 is provided in hopper zone 20. Screw feeder 28 is provided in hopper zone 20 and mixing zone 22. Conical grinding means 30 is provided in grinding zone 24. Similarly, second grinder 12 has hopper zone 60, mixing zone 62 and grinding zone 64. A silicon containing feedstock is processed through first and second grinders 10 and 12 in the presence of an alkaline water feedstock to produce the binding solution.

The silicon food material may be obtained from a variety of sources. Preferably, the silicon feedstock comprises at least about 70% $SiO_2$, more preferably, the feed material comprises at least about 85% $SiO_2$ and, most preferably, the feed material comprises at least about 95% $SiO_2$. By increasing the amount of silicon dioxide in the silicon feedstock, a binder which will produce a cured product having increased strength is prepared.

The feedstock preferably has no or substantially no iron therein. The feedstock, and hence the binding solution, may contain from about 25 to about 0 ppm iron, more preferably from about 15 to about 10 ppm iron and, most preferably from about 10 to about 0 ppm iron.

The presence of more than about 5 wt. % iron in the binding solution produces coagulation of the silicon particles contained therein and a decrease in the strength of products made from the binding solution. If too much iron is contained in the feedstock, then the iron may be removed by benefication such as by froth flotation or magnetization. In view of the cost and capital equipment required in the benefication of a silicon feedstock, a silicon feedstock having no or substantially no iron is preferred. For these reasons, the presence of other metals is also limited in the feedstock and in the binding solution.

Sand and other feedstocks may contain compounds which may adhere to the grinding surfaces and accordingly are preferably avoided. For example, if the feedstock contains calcium and/or magnesium, carbonates may be formed. Accordingly, the feedstock is preferably free or substantially free of elements which may produce compounds which will foul the equipment.

The silicon feedstock may be obtained from a variety of sources. The silicon feedstock may comprise one or more of sand, quartz, quartzite, sandstone, mica, glass and recycled glass. More preferably, the silicon feedstock comprises sand, glass and recycled glass and, most preferably, the silicon feedstock comprises sand.

The silicon feedstock may be free or substantially free of water. Preferably, the silicon feedstock has a humidity of from about 0 to about 11%, more preferably from about 0 to about 7% and, most preferably, from, about 0.5% to about 1.5%. As the amount of water is increased, then it is preferred to increase the pH of the alkaline solution.

The silicon feedstock and the alkaline water feedstock are mixed prior to the grinding stage so that the silicon is ground in an alkaline environment. Preferably, the pH of the mixture of feedstocks varies from about 9.5 to about 11 and, more preferably from about 9.8 to about 10.5. If the feedstock contains about 75% silicon dioxide, then a higher pH such as about 10.5 is preferably used. If the feedstock comprises a greater percentage of silicon dioxide, then a lower pH may be used. The alkaline feedstock may be produced from any compound which, when placed in water, will dissociate to provide hydroxyl ions. The alkaline feedstock may be produced from LiOH, NaOH, KOH and from ammonium hydroxide.

The mixture of the silicon and the alkaline water feedstocks may have a humidity of from about 20% to about 30% and, more preferably, about 25%. The amount of silicon dioxide and water which are utilized, as well as the pH of the alkaline solution, are adjusted to obtain a mixture of silicon feedstock and alkaline water feedstock having the above mentioned water content and pH. Generally, from about 20 to about 30% and, more preferably, about 25% alkaline water feedstock is mixed with the silicon feedstock, based upon the total weight of the silicon and alkaline water feedstocks.

The silicon dioxide particles of the feedstock are ground to produce fines. Generally, the smaller the fines, the better the binding solution. As will be appreciated by those skilled in the art of grinding, the product produced by a grinder will contain particles having a range of sizes. Preferably, a majority of the fines have a diameter less than about 0.30 mm, more preferably less than about 0.17 mm and, most preferably, less than about 0.03 mm. If a majority of the particles have a smaller diameter, then about 20 to about 25 wt % of the fines may have a diameter up to about 0. 45 mm. The feedstock is ground so as to produce particles which are generally spherical in shape. The particles have a surface which is effectively uniform in shape with pits which are relatively shallow as compared to the diameter of the particles.

It will be appreciated by those skilled in the art that one or more grinders may be utilized. Depending upon the size of the particles added to the grinder, the longitudinal length of the grinding zone and the power applied to the grinder, a larger particle size reduction may be obtained in each grinder.

In the preferred embodiment shown in FIG. 1, two grinders are placed in sequence. If three or more grinders are used, a smaller particle size reduction would be required in each stage. If two grinders are utilized, then the particle size of the silicon dioxide feedstock to the first grinder may vary from about 0.45 mm to about 50 mm and, more preferably, from about 1 mm to about 5 mm. If the feedstock meets this requirement, then grinder 10 may produce silicon dioxide particles having a diameter from about 0.5 mm to about 2 mm and, most preferably, about 1 mm.

Without being limited by theory, it is believed that the silica is crushed so as to fracture the crystal structure of the silicon dioxide. When this occurs, the bonding between the silicon atoms and the oxygen atoms in the crystal structure is disrupted along the fracture plane. Some of the silicon atoms along the exterior of this fracture plane may not have sufficient oxygen atoms associated therewith and accordingly will have a net positive charge. The net positive charge attracts hydroxyl ions which commence to leach silicon from the exposed crystal surfaces. The reaction of the hydroxyl ions with the silicon in the silicon dioxide produces a layer of orthosilicic acid according to the following general reaction schematic:

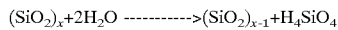

$(SiO_2)_x + 2H_2O \longrightarrow (SiO_2)_{x-1} + H_4SiO_4$

As the coarser particles are ground to finer particles, the rough edges are removed so that the particles take on a spherical shape with relatively shallow pits. Silicon is leached from the outer surfaces as well as from the layers of silicon that are removed as the particles are ground to form the orthosilicic acid. The orthosilicic acid is produced as discrete particles of a sol. The sol is miscible in water. When the sol particles adhere to the silicon dioxide, they form a layer of orthosilicic acid surrounding the silicon dioxide particles. The orthosilicic acid sol remains as discrete units attached to the silicon dioxide. Preferably, the concentration of orthosilicic acid sol in the binding solution is greater than about 10 and, more preferably, greater than about 20 g/l.

If the pH in the grinder is outside the range 9.5–11, then a stable binding solution containing orthosilicic acid sol will not be formed. For example, if the pH is below about 9.5, then the orthosilicic acid sol will quickly change to a gel.

Figure 2:
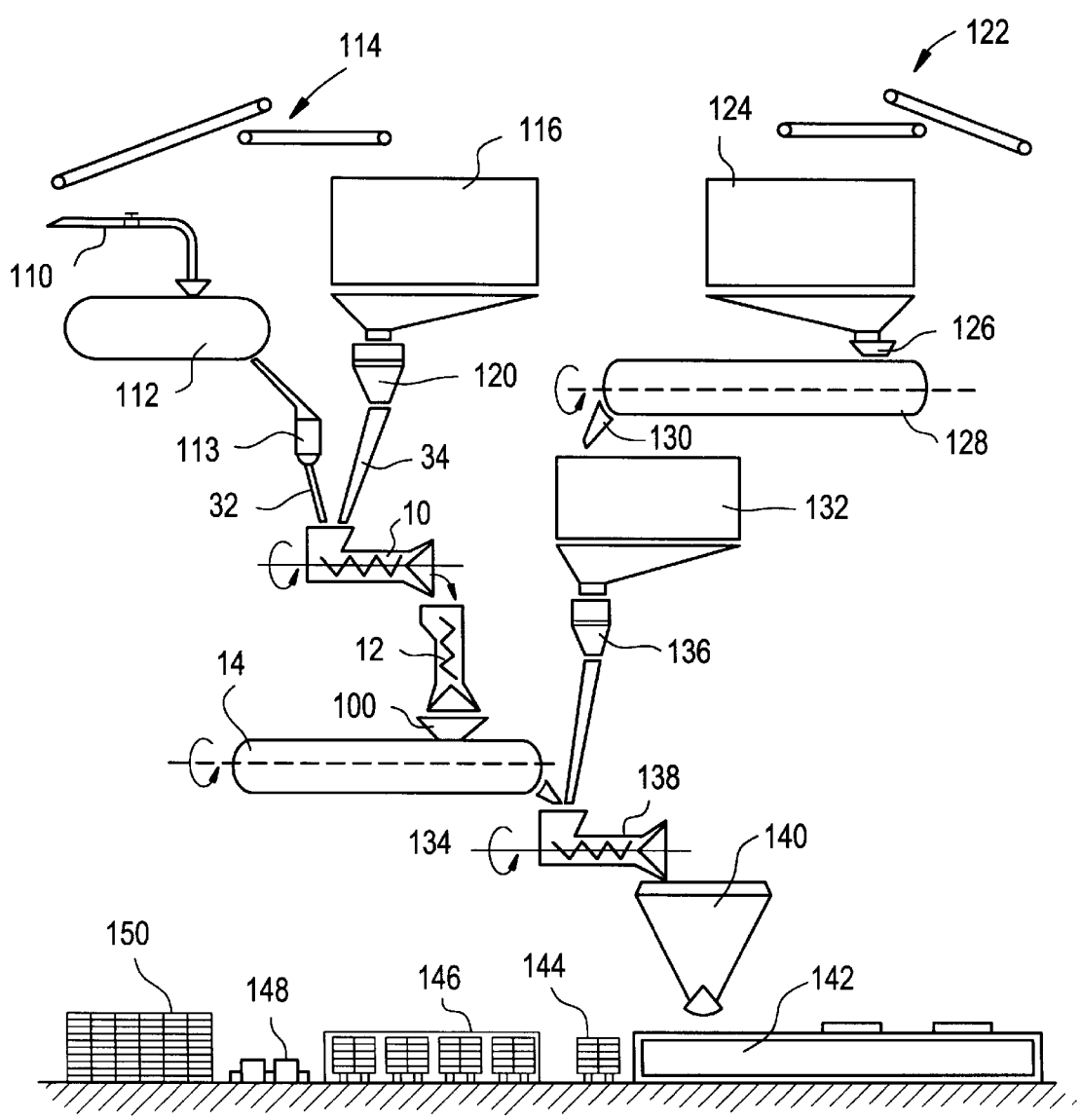
FIG. 2 is a schematic for producing a product from the binding solution and filler according to the instant invention.

Referring to FIGS. 1 and 2, the alkaline feedstock is fed to first grinder 10 via first conduit 32. Similarly, the silicon feedstock is fed to first grinder 10 via second conduit 34. The feedstocks enter first grinder 10 through hopper 26. As will be appreciated by those skilled in the art, the alkaline water feedstock and silicon feedstock may be mixed together prior to entry into the hopper. Alternately, as shown in FIG. 1, screw feeder 28 may be used to mix the feedstocks together prior to the grinding of the silicon feedstock in grinding zone 24.

Screw feeder 28 comprises helical blade 36 which is fixedly mounted on first drive shaft 38. First drive shaft 38 is rotatably mounted in first grinder 10 and is connected to drive means 40. Drive means 40 may be any drive means known in the art which may be used to impart rotational movement to shaft 38 at a controlled rate. As shaft 38 rotates, helical blade 36 mixes the alkaline feedstock and the silicon feedstock together to produce a slurry and transports the mixed feedstock, under pressure, through mixing zone 22 to grinding zone 24.

In order to maintain the mixture of feedstocks in a fluid state, the temperature of the feedstocks in grinder 10 is maintained above the freezing point of the mixture. Preferably, the temperature in grinding zone 24 is maintained from about 55° C. up to the evaporation temperature of the water in the mixture, more preferably from about 60 to about 80° C. and, most preferably from about 70 to about 80° C. If the temperature is maintained below about 55° C., then the surface of the silicon dioxide particles will not be properly activated and the binding solution will not be formed.

Figure 4:
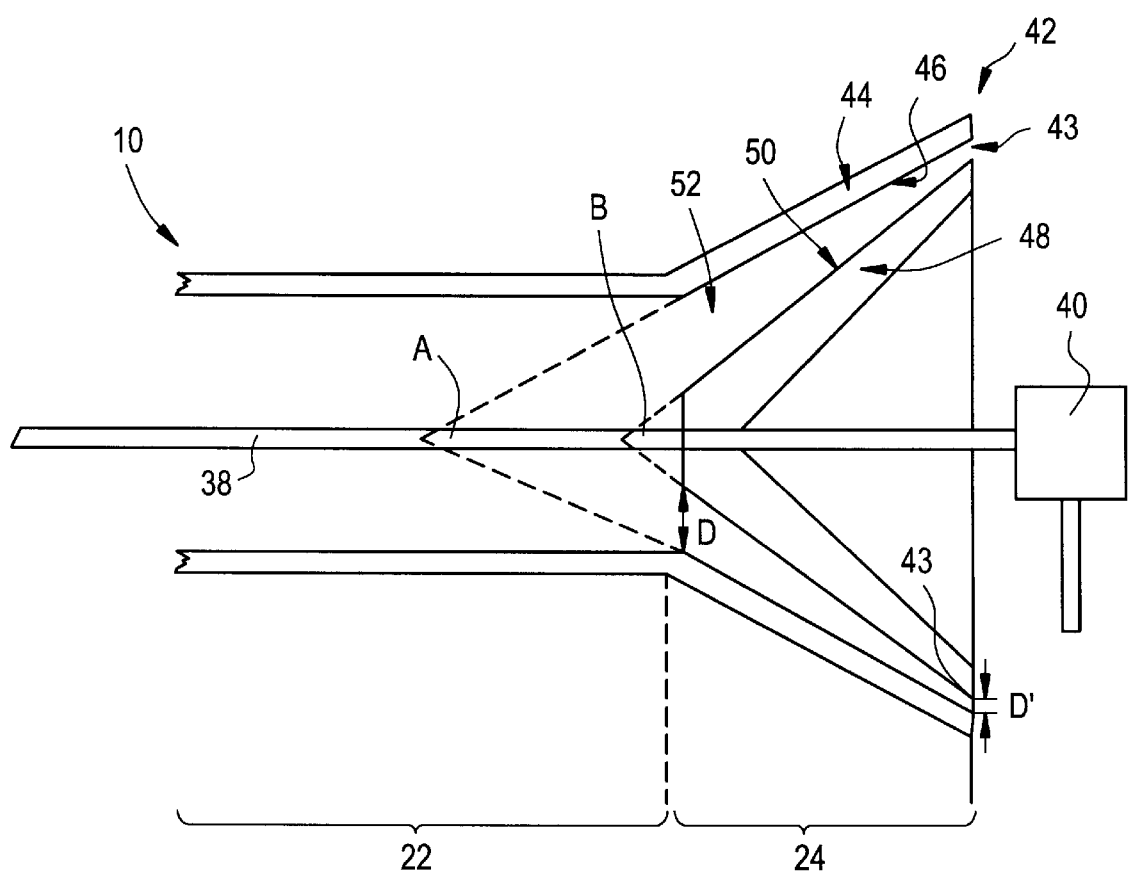
FIG. 4 is an enlargement of a partial cross-section through the first grinder of FIG. 2.

As shown in more detail in FIG. 4, grinding zone 24 is positioned at distal end 42 of grinder 10. Distal and 42 is provided with flared housing 44. Flared housing 44 has inner surface 46. Rotationally mounted within flared housing 44 is conical grinder 48. Conical grinder 49 has outer surface 50. Both flared housing 44 and conical grinder 48 are frusto conical in shape. Flared housing 44 is a section of a cone having an apex angle designated by reference letter A. Similarly, conical grinder 48 is a section of a cone having an apex angle generally referred to by reference letter B. Conical grinder 48 is fixedly mounted to first drive shaft 38 so as to rotate as drive shaft 38 rotates. In addition, conical grinder 48 is positioned so as to be coaxially mounted on drive shaft 38 with respect to flared housing 44. The ground slurry exits from grinder 10 through gap 43 between flared housing 44 and conical grinder 48.

The space between inner surface 46 of flared housing 44 and outer surface 50 of conical grinder 48 is generally designated by reference numeral 52 and comprises the working zone of grinder 10. Apex angle B of conical grinder 48 is greater than apex angle A of flared housing 44. Accordingly, working zone 52 narrows from a distance generally referred to by letter D at the end of the working zone adjacent the apex angles to a distance D' at gap 43.

Apex angle B is always greater than apex angle A. Preferably, apex angle B is from about 10 to about 20 degrees greater than apex angle A and, more preferably, about 15 degrees greater than apex angle A. Apex angle B may be up to about 120 degrees and, more preferably, is about 75 degrees.

As the mixed feedstock enters into grinding zone 24, the mixed feedstock in forced into working zone 52. Sufficient pressure is applied to the feedstock mixture at the entry to grinding zone 24 to ensure that the feedstock mixture is ground in grinding zone 24. The rotation of conical grinder 48 relative to flared housing 44 causes the silicon particles to travel in a spiral—translational course through work zone 52. During this travel, each particle is caused to rotate along an axis passing through the particle. Accordingly, the particles undergo a type of planetary rotation whereby they rotate on their own axis while they rotate around shaft 38 in grinding zone 52. The crushing force applied through conical grinder 48 is primarily a function of rotor mass, radius and rotational speed. Throat size D of the working zone, the power input to conical grinder 48 via first drive shaft 38 and the particle sized reduction are balanced to ensure that the silicon dioxide does not result in working zone 52 becoming jammed with silicon dioxide particles.

As shown in FIG. 1, grinder 10 is positioned such that drive shaft 38 extends horizontally through the grinder. However, grinder 10 may be oriented vertically or in any other orientation an may be convenient.

As grinder 10 is used, the distance D' may increase due to wear of surfaces 46 and 50 or through a misalignment of grinder 48. Accordingly, means may be provided to regulate the position of grinder 48 with respect to housing 44. This means may comprise the clamping device which fixes conical grinder 48 to first drive shaft 38 (not shown). Alternately, the adjustment means may comprise means for moving first drive shaft 38 longitudinally inwards or outward with respect to housing 44 (not shown).

Second grinder 12 is adapted to receive the slurry produced by first grinder 10. The construction of grinder 12 may be similar to construction of grinder 10. The slurry from grinder 10 is fed into hopper 66. Screw feeder 68, which in positioned in hopper zone 60 and mixing zone 62, comprises helical blade 72 positioned on second drive shaft 70. Second drive shaft 70 is mounted in journalled terminal support 74 and is drivenly connected to drive means 40. The slurry is fed by screw feeder 68 from hopper zone 60 to grinding zone 64. The pH of the slurry prior to the entry into grinding zone 64 is from about 9.5 to about 11 and, more preferably from about 9.8 to about 10.5. If the pH of the slurry is below this range, additional alkaline feedstock may be added to increase the pH.

Figure 5:
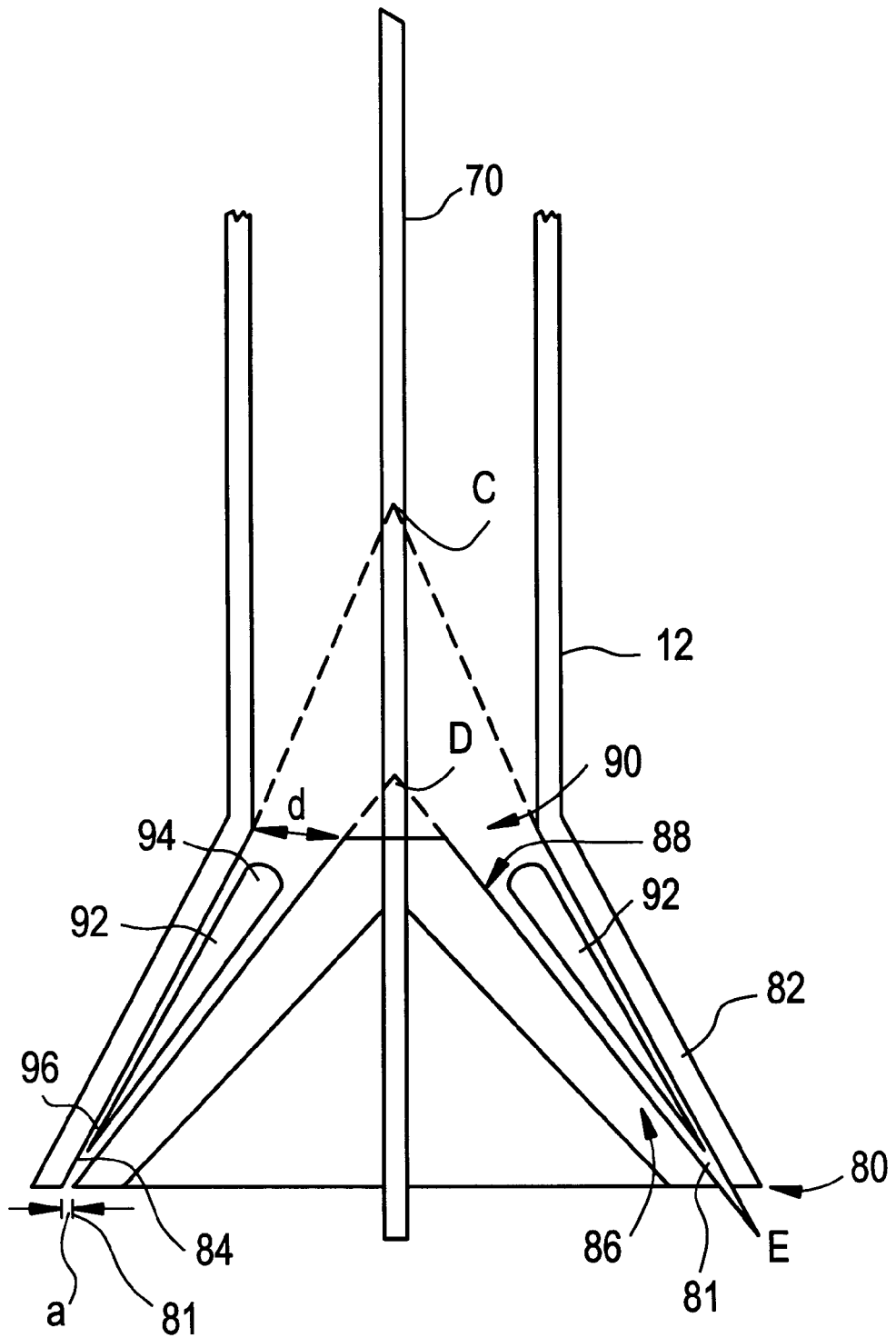
FIG. 5 is an enlargement of a partial cross-section through the second grinder of FIG. 2.
Figure 8:
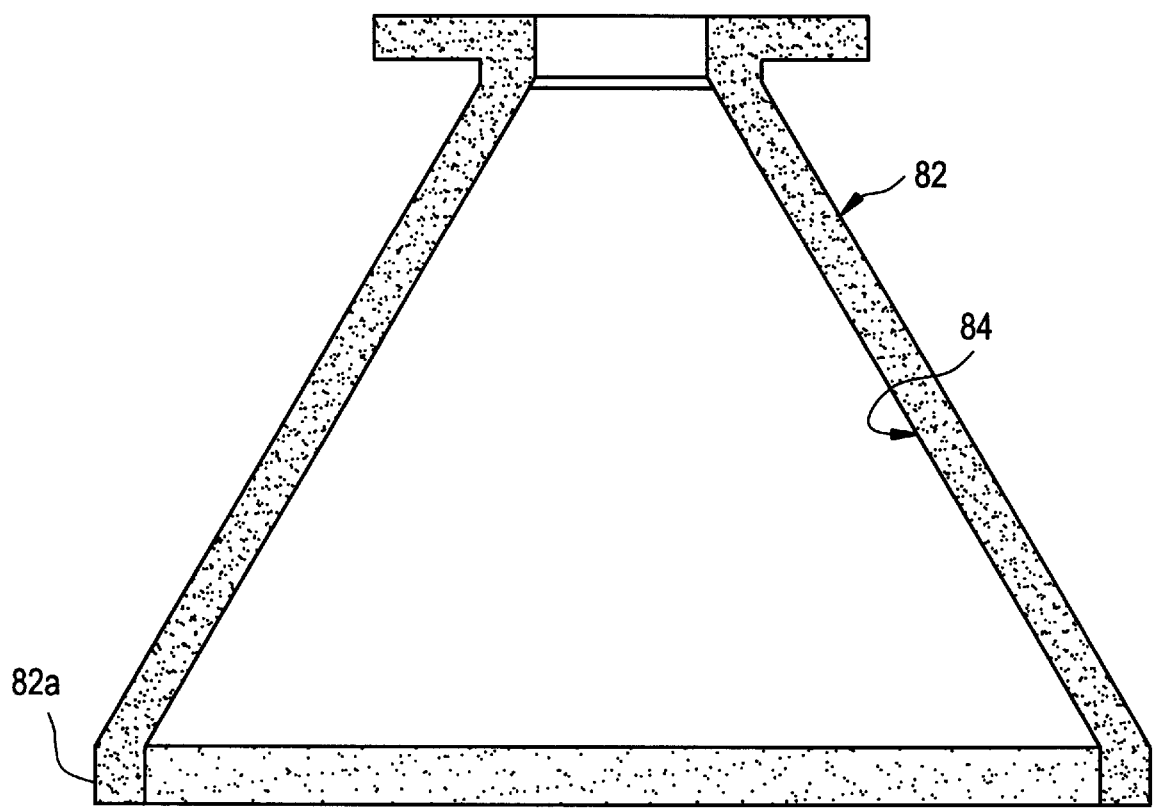
FIG. 8 is an enlargement of a partial cross-section through an alternate construction of the outer housing of the second grinder of FIG. 2.
Figure 9:
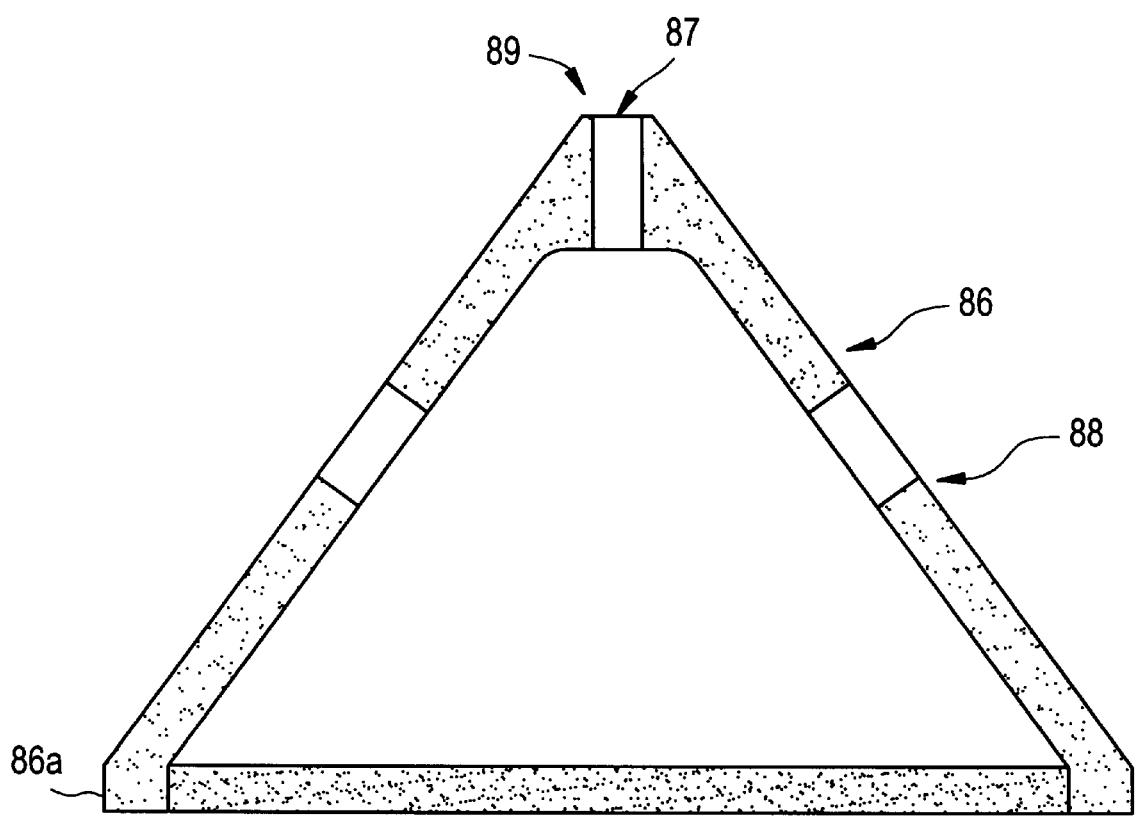
FIG. 9 an enlargement of a partial cross-section through an alternate construction of the conical grinder of the second grinder of FIG. 2; and, FIG. 10 is a more detailed cross-section through the grinder of FIG. 5.

As shown in more detail in FIGS. 5, 8 and 9, grinding zone 64 is formed by flared housing 82 of second grinder 12 and conical grinder 86. Flared housing 82 and conical grinder 86 are frusto conical in shape. Conical grinder 86 has opening 87 in circular top 89 to receive second drive shaft 70. Conical grinder 86 is fixedly mounted to second drive shaft 70 so as to rotate as drive shaft 70 rotates. In addition, conical grinder 86 is positioned so as to be coaxially mounted on drive shaft 70 with respect to flared housing 82.

Flared housing 82 has inner surface 84 and conical grinder 86 has outer surface 88. Working zone 90 is positioned between inner surface 84 and outer surface 88. Flared housing 82 is a section of the cone having an apex angle designated by reference letter C. Similarly, conical grinder 86 is a section of a cone having an apex angle generally referred to by reference letter D. Work zone 90 is triangular in cross-section and has apex angle E which is defined by inner surface 84 and outer surface 88. The ground slurry exits from grinder 12 through gap 81 between flared housing 82 and conical grinder 86.

Working zone 90 comprises the apace between inner surface 84 of flared housing 82 and outer surface 68 of conical grinder 86. Apex angle D of conical grinder 86 is greater than apex angle C of flared housing 82. Accordingly, working zone 90 narrows from a distance generally referred to by letter d at the end of the work zone adjacent the apex angles to a distance d' at gap 81.

Apex angle D is always greater than apex angle C. Preferably, apex angle D varies from about 10 to about 20 degrees greater than apex angle C and, more preferably, is about 15 degrees greater than apex angle C. Apex angle D may be up to about 120 degrees and, more preferably, is about 75 degrees.

Figure 10:
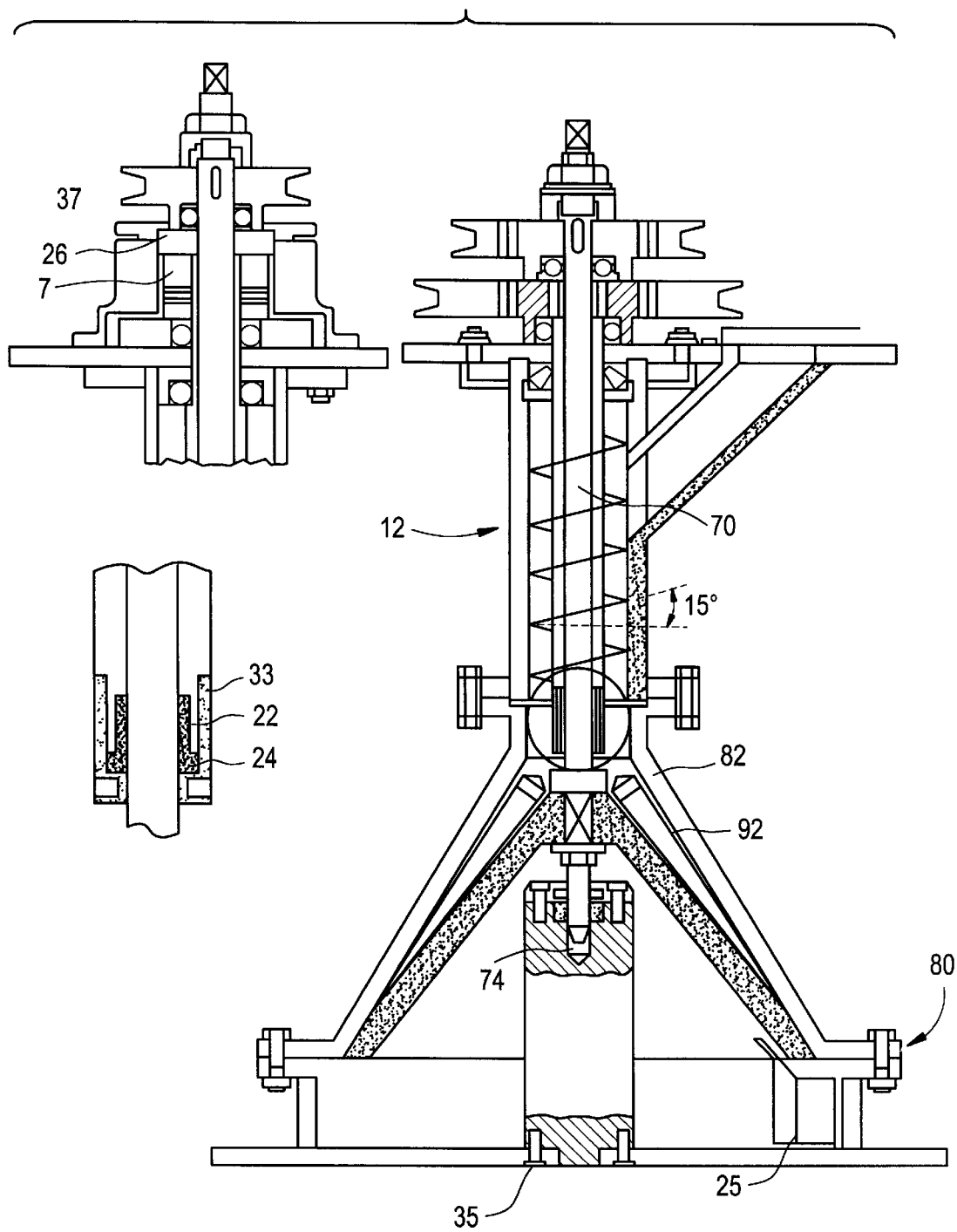

As shown in FIG. 10, a plurality of spindles 92 may be positioned in working zone 90. Spindles 92 are in contact with the grinding surface adjacent end 80 of grinder 12. Generally, if apex angle D is greater than about 75 degrees, then spindles 92 will tend not to remain properly seated in work zone 90 and may in fact obstruct grinder 12. If apex angle D in less than about 75 degrees, then spindles 92 are preferably inserted in work zone 90. If spindles 92 are used, then apex angles C and D are adjusted such that a sufficient amount of surface 98 of spindles 92 is in contact with outer surface 88 of conical grinder 86 and inner surface 84 of flared housing 82 to ensure that spindles 92 rotate as conical grinder 86 rotates relative to flared housing 82. Preferably from about ¼ to about ⅓ of surface 98 is in such contact.

As grinder 12 is used, the distance d' may increase due to wear of surfaces 84 and 88 or through a misalignment of grinder 86. Accordingly, means may be provided to regulate the position of grinder 86 with respect to housing 82. This means may comprise the clamping device which fixes conical grinder 88 to second drive shaft 70 (not shown). Alternately, the adjustment means may comprise means for moving second drive shaft 70 longitudinally inwards or outward with respect to housing 82 (not shown).

The portion of flared housing 82 and conical grinder 86 adjacent and 80 may be parallel. Accordingly, as shown in the alternate preferred embodiments set out in FIGS. 8, 9 and 10, flared housing 82 may have end portion 82a. Similarly, conical grinder 86 may have end portion 86a. As surfaces 84 and 89 are worn due to the use of the grinder, conical grinder 86 may be moved relative to flared housing 82 to maintain distance d' at the desired size. A similar construction may be applied to grinder 10.

Figure 6:
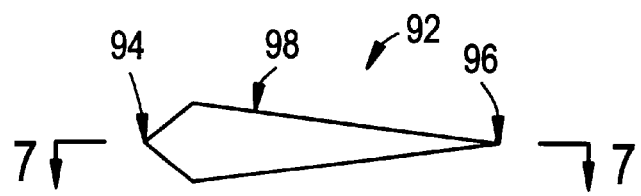
FIG. 6 is a perspective view of a spindle used in the grinder of FIG. 5.
Figure 7:
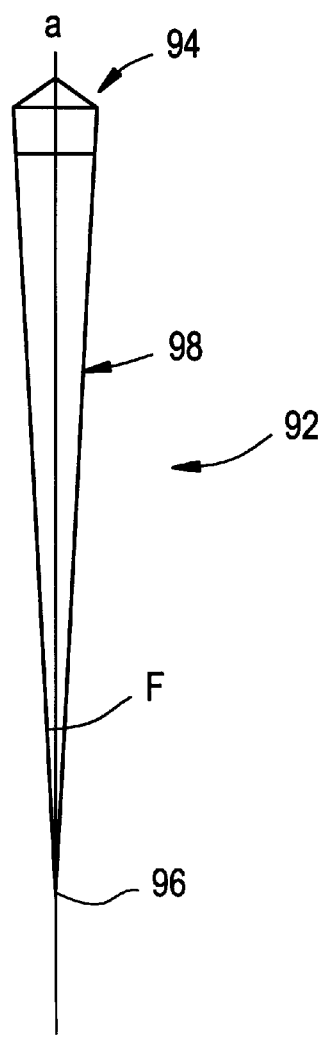
FIG. 7 is a cross-section through the line 7—7 in FIG. 6.

As shown in FIGS. 6 and 7, spindles 92 are generally longitudinally extending cone shaped elements having a first end 94 and a second end 96. Each spindle has an outer surface 98 which forms part of the grinding surface of second grinder 10. Rotation of conical grinder 86 with respect to flared housing 82 causes spindles 92 to rotate along axis a. The apex angle, designated by letter F, is located at second end 96. Spindles 92 are of a sufficient length to occupy most of the distance of working zone 90 from a position adjacent the end of screw feeder 68 to a position adjacent distal end 80.

As shown in cross section in FIG. 5, apex angle F is less than apex angle E such that work zone 90 narrows at a faster rate than spindle element 92. Preferably, angle E is about 2 degrees greater than angle P, and, more preferably, about 1.5 degrees. Accordingly, if apex angle D is about 15 degrees greater than apex angle C, apex angle F preferably is about 6 degrees. Accordingly, by this construction, a sufficient amount of the outer surface of the spindles is in contact with the grinding surfaces of the flared housing and the conical grinder to cause the spindles to rotate in the work zone. Since end 96 is narrower than end 94, the line speed of rotation of surface 98 is faster at end 96 than at end 94. The greater angle PI the greater in the change in speed.

A sufficient number of spindles are used to surround most of the perimeter around top surface 89 of conical grinder 86. When viewed from above, the spindles are positioned somewhat outwardly from surface 88. Preferably, the spindles will form a discontinuous wall around conical grinder 86 and preferably define an area equivalent from about ⅔ to about ¾ of the perimeter of top 89 of conical grinder 86. In the embodiment shown herein, three spindles are used.

Since spindles 92 narrow at a faster rate than working zone 90, there are clearances between inner surface 84 of flared housing 82 and outer surface 98 of spindles 92. In addition, there are clearances between outer surface 88 of conical grinder 86 and outer surface 98 of spindles 92. These clearances narrow towards second end 96 of spindles 92.

Sufficient pressure is applied to the feedstock mixture at the entry to the grinding zone 90 to ensure that the feedstock mixture is ground in grinding zone 90. The crushing force applied through conical grinder 86 is primarily a function of rotor mass, radius and rotational speed. Throat size d of the working zone, the power input to conical grinder 86 via second drive shaft 70 and the particle sized reduction are balanced to ensure that the silicon dioxide does not result in working zone 90 becoming jammed with silicon dioxide particles.

As the slurry exits from mixing zone 62 and enters working zone 64, the slurry comes into contact with first end 94 of spindles 92. The rotation of conical grinder 86 relative to flared housing 82 causes the slurry to undergo a planetary rotation. The slurry passes along a spiral trajectory through working zone 90. In addition, the slurry particles will rotate lengthwise around their axes. This rotation is accentuated by spindle elements 92 which themselves rotate in a direction counter to the rotation of conical grinder 86.

During the passage of the slurry through working zone 90, the diameter of the particles may be reduced by about tenfold in size. During the passage, the particles are continually ground. During this grinding, the crystal structure of the silicon dioxide is continually sheared, split, and fractured so as to expose new surfaces to the hydroxides present in the slurry. This continual grinding results in the production of a silica sol. As the process continues, more hydroxyl ions are continually bound up in the formation of silicic acid.

Preferably, second grinder 12 is positioned with drive means 70 extending along a vertical axis. In this orientation, spindles 92 maintain their seating in working zone 90 due to the force of gravity and the force of the slurry passing over the spindles. Alternately, second grinder 12 may be placed in another orientation, such as horizontal. However, in this orientation, gravity will not assist in maintaining spindles 92 in working zone 90.

The grinding surfaces of grinders 10 and 12, namely inner surface 46, outer surface 50, inner surface 84, outer surface 88 and outer surface 94 of spindles 92 are preferably constructed from a hard-wearing material such as corundum. Due to the contaminating effect of iron in the binding solution, the surfaces should comprise a material which will impart few iron ions into the binding solution.

The binding solution produced in second grinder 12 is fed to hopper 100 from where it enters stabilization tank 14. The binding solution is a thixotropic mixture. Accordingly, binding solution 102 is continually agitated in stabilization tank 14 to keep the binding solution in a fluid state. If the binding solution is not agitated, it will solidfy as is known of thixotropic materials and substantial energy input will be required to re-fluidize the binding solution. To this end, stabilization tank 14 is mounted so as to be rotatable about horizontal axis b. For example, tank 14 may be positioned on roller supports which are driven by a friction drive through a reducer (not shown). The rotation of the stabilization tank imparts sufficient agitation to maintain the binding solution in its fluid state. Accordingly, the binding solution is available for use as may be required in subsequent processing. The binding solution may be stored in sealed containers for extended periods of time (for example up to six to eight months) for use at a later time.

The binding solution may be mixed with a filler to produce a finished product having high strength. A variety of solid particulate fillers may be utilized including silica containing materials such as sand, vermiculite, glass, wood products such as wood fibre and saw dust, plastic, dross, ash, and other natural or synthetic particles.

A sufficient amount of binding solution to prepare a hardened cured product is used. Preferably, from about 20 to about 35 weight. percent binding solution is used based upon the weight of the filler to which it is mixed. More preferably, about 30 weight percent binder is used.

Preferably, the mixture of binding solution and filler comprises up to about 5 weight percent water. More preferably, the mixture of binding solution and filler comprises about 1.5% water. Accordingly, it is preferred to use a dry or essentially dry filler. If excess amounts of water are present in the mixture of binding solution and filler, then the strength of the cured product will decrease.

By appropriately selecting the filler, a variety of end products can be prepared. For example, if the filler comprises silica such as sand, then a brick may be produced. Alternatively, a mortar comprising binding solution and sand may be prepared. This mortar may be utilized to bond the brick comprising binding solution and silica. Alternately, the mixture may be extruded into a desired shape such as tile.

It will be appreciated by those skilled in the art that various additives may be added to the mixture to alter the characteristics of the final product. In particular, additives such as colorants, ultraviolet inhibitors, flame retardants, fluorescence and phosphorescence may be incorporated to alter the appearance and other properties of the final product. For example, by adding a colorant, bricks in a variety of colours may be produced.

The process steps to prepare a finished product using the binding solution comprise mixing the binding solution, filler and additives together, forming the mixture into a desired shape, such as by placing the mixture in a mould, and curing the mixture.

During caring, water is removed from the mixture. Without being limited by theory, it is believed that when the water is driven off, the orthosilicic acid sol changes to an orthosilicic acid gel. The orthosilicic acid gel then solidifies to form a matrix which surrounds the particulate filler.

Referring to FIG. 2, a process schematic is set out for a method of producing a moulded brick product according to the instant invention. The alkaline water feedstock is fed via pipe 110 to alkaline water storage tank 112. The silica feedstock is fed via conveyor belt 114 to storage bin 116. Metering devices 118 and 120 are used to adjust the ratio of alkaline water to silica feedstock which are fed to first grinder 10. As discussed above, the feedstocks are processed through grinders to produce a binding solution of silica sol. The silica sol is fed via hopper 100 into stabilization tank 14. The rotation of stabilization tank 14 maintains the silica sol in a fluidized state for uses which may be required in the process.

The filler material, such as sand, is fed via conveyor belt 122 into storage bin 124. The sand is fed to dryer 128 via hopper 126. The sand may be dried by any means known in the art. Heat may be applied to drier 128 by air tumbling, tumble drying in a drum and microwave energy. Dryer 128 is rotated to dry the sand so that it has a humidity preferably less than about 5% and, more preferably, about 1.5%. The dried sand is fed via feeder 130 into storage bin 132. The sand is now ready to be used as may be required in the process.

The dried sand and binding solution are combined together for preparation of the final product. The binding solution and filler are mixed to ensure that the sand, or other filler, is intimately mixed with the binding solution.

Preferably, the surface of the filler is subjected to shearing forces. The shearing activates the surface and results in the production of a cured product having enhanced strength. The filler may be sheared by mixing the binding solution with the filler in such a manner as to abrade the surface of the filler. Preferably, the filler and binding solution are passed through a grinder similar to grinder 10.

As shown in FIG. 2, the binding solution is fed to grinder 138 through feeder 134. The sand is fed to grinder 138 via metering device 136. Metering device is utilized to ensure that appropriate portions of sand are mixed with the binding solution. Grinder 138 is similar to grinder 10. The mixture exits from grinder 138 and is stored in storage bin 140. The product of grinder 138 and is a fluid mass which is adapted to be moulded.

The moulding mix may be fed immediately from bin 140 to moulder 142. Moulder 142 may be any of those which are conventionally used in the art of making bricks. Alternately, the moulding mix may be stored in a sealed environment to prevent the loss of water from the mixture. If the mixture is stored in a sealed environment, then it remains stable for an extended period of time.

The moulding mix is fed from storage bin 140 into a plurality of moulds in moulding unit 142. The mix is compacted into the mould such as by the use of agitation and pressure. The bricks are preferably removed from the mould prior to curing. The moulded bricks may then be loaded on a dolly 144 and transported to oven 146 for curing. A variety of sources may be utilized to cure the product including convection, forced convection, radiation and microwave energy. Preferably, the curing is conducted utilizing microwave energy. It is believed that the use of microwave energy allows the water to exit from the brick during the curing process. If, for example, conduction is utilized to cure the brick, then, depending upon the thickness of the brick and the temperature of the oven, sufficient water may not evaporate from the interior of the brick prior to the exterior surface hardening.

During the curing process, the brick effectively becomes neutralized. As water is evaporated from the brick, the pH decreases and the orthosolicic acid becomes silicon dioxide. Thus, the pH of the cured product will be essentially neutral. The pH of the brick may be from about 6.0 to about 7.5 and, more preferably, from about 7.0 to about 7.5. The length of time the product remains in the oven will vary upon the type of heating source which is utilized. A standard sized brick will cure in about six hours in a standard convention oven which is at a temperature from about 90 to about 140° C. However, if microwave heating is utilized, then the same product would set in about 40 minutes using 50 Kwatts. After curing, the bricks are removed from the moulds. The bricks may then be packaged in packaging unit 148 and shipped to storage unit 150.

Figure 3:
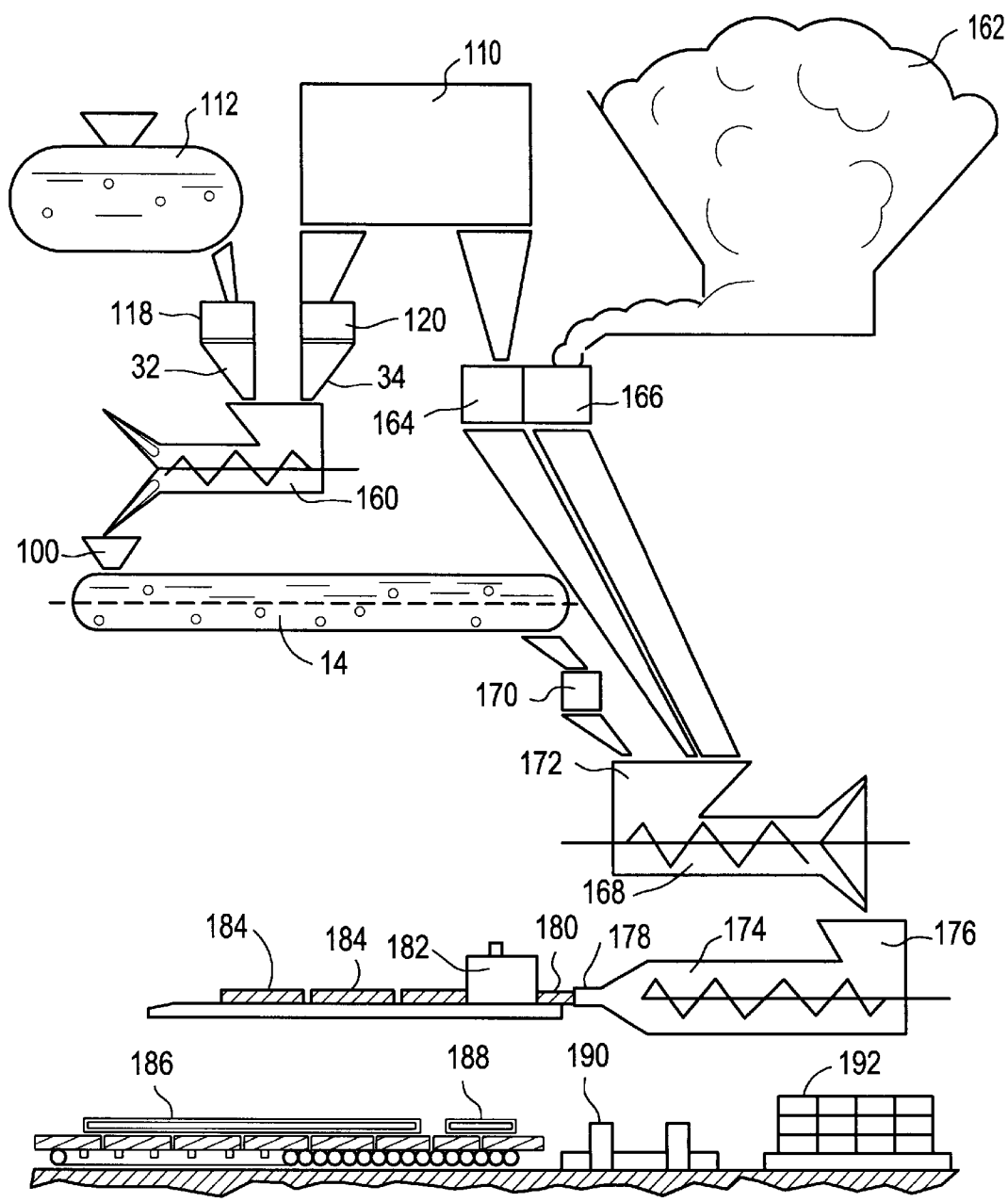
FIG. 3 is an alternate process for producing a product using the binding solution and filler according to the instant invention.

FIG. 3 discloses a process schematic for producing ceramic products such as tiles utilizing the binding solution of the instant invention as a modifier of clay. According to this preferred embodiment, the alkaline solution and sand are fed via first and second conduits 32 and 34 to grinder 160. The sand is ground in the presence of the alkaline solution to produce the binding solution which is fed via hopper 100 to storage tank 14. Optionally, sand may be fed via feeder 164 to grinder 168. Clay in storage bin 162 is fed via feeder 166 to grinder 168. Binding solution is fed from storage tank 14 to grinder 168 via dosing chamber 170. Each of these ingredients is fed into hopper 172 of grinder 168.

Grinder 168 is similar in construction to grinder 10 and is utilized to intimately mix the clay, sand and binder solution. The clay is used to add a traditional look to the product.

The amount of binder solution which is utilized may be up to about 50% based on the weight of sand and clay. The clay, sand and binding solution is intimately mixed in grinder 168. During the passage through grinder 168, the feed materials are agitated and are of a relatively uniform consistency upon exit from grinder 168.

Once the mass has been prepared, it may be subjected to a variety of processes known in the art to produce tiles. As shown in the attached embodiment, the uniform mass is fed to screw feeder 174 via hopper 176. Screw feeder 174 extrudes the uniform mass as a continuous ceramic sheet 180 is fed to automatic tile cutter 182 which cuts the ceramic sheet into individual tiles 184 having the desired length.

The tiles are subsequently transported to oven 186 where they are cured. The oven may use a variety of technique to heat the tiles including convection, forces convection, radiation and microwave energy and, preferably, microwave energy. Due to the use of the binding solution, the tiles must be cured for a much shorter period of time as compared to the tiles manufactured just from clay and, in addition, at a much lower temperature such as from about 500° C. to about 800° C.

Subsequent to their exit from oven 186, the tiles may be sent to cooler 188 where the tiles may cool to a desired handling temperature. The tiles may be cooled by natural convection, or forced convection. Subsequent to cooling, the tiles are sent to packaging unit 190 and are subsequently shipped to warehouse 192 where they are stored for use.

A ceramic tile produced according to the method FIG. 3 has good physical and handling characteristics. The tile has high density, low contraction and a high resistance to flexure and compression. In addition, due to the use of the binding solution and sand, the curing time for the tile in oven 186 may be as much as 10 to 15 times as fast as with conventional clay tiles.

EXAMPLE 1

The following example demonstrates the production of the binding solution according to the instant invention. 50 liters of sand at 25% humidity was placed into a grinder of the instant invention. A quantity of $Na_2SiO_6$ was added to the alkaline fluid to stabilize the pH within the range of 9.8 to 10.5.

| Grinding Hours | Comments |
| --- | --- |
| 0 | commenced grinding |
| 1 | first inspection. Sample taken and analysed for the presence of the orthosilicic acid sol which was found to be present in the concentration of 20.75 g/l |
| 1.5 | second inspection. Sample taken and analysed for the presence of the orthosilicic acid sol which was found to be present in the concentration of 22.275 g/l |
| 2 | third inspection. Sample taken and analysed for the presence of the orthosilicic acid sol which was found to be present in the concentration of 22.945 g/l |

| Grinding Hours | Comments |
|---|---|
| 3 | fourth inspection. pH 9.3. Sample taken and analysed for the presence of the orthosilicic acid of which was found to be present in the concentration of 23.715 g/l |
| 3.25 | Test concluded |

EXAMPLE 2

This comparative example demonstrates the production of a binding solution utilizing a ball mill. 24 liters of sand at 25% humidity was placed into a 100 liter ball mill. A quantity of $Na_2SiO_6$ was added to the alkaline fluid to stabilize the pH within the range of 9.8 to 10.5.

| Grinding Hours | Comments |
|---|---|
| 0 | commenced grinding in the ball mill |
| 1 | first inspection. pH has dropped to 8.7. A quantity of $Na_2SiO_6$ was added to raise the pH to 9.8 |
| 1.5 | second inspection. pH 9.0. Sample taken and analysed for the presence of the orthosilicic acid sol which was found to be present in the concentration of 7.1 g/l |
| 2 | third inspection. pH 9.3. Sample taken and analysed for te presence of the orthosilicic acid sol which was found to be present in the concentration of 9.7 g/l |
| 3 | fourth inspection. pH 9.3. Sample taken and analysed for the presence of the orthosilicic acid sol which was found to be present in the concentration of 9.7 g/l |
| 6 | fifth inspection. pH 9.0. Sample taken and analysed for the presence of the orthosilicic acid sol which was found to be present in the concentration of 11.2 g/l |
| 12 | Sixth inspection. pH 9.0. Sample taken and analysed for te presence of the orthosilicic acid sol which was found to be present in the concentration of 11.9 g/l |
| 24 | seventh inspection. pH 9.0. Sample taken and analysed for the presence of the orthosilicic acid sol which was found to be present in the concentration of 20.5 g/l |

As can be seen from the foregoing, a similar concentration of orthosilicic acid sol using the ball mill of the prior art is only obtained after about 24 hours of grinding as compared one to two hours using the method of this invention.

EXAMPLE 3

The binding solutions of Examples 1 and 2 were used to prepare standard building bricks. Two samples of 9 bricks each, each having a surface area of 5 cm×5 cm (25 cm$^2$) were prepared with a binding solution produced in a ball mill according to the method of Example 2 and the grinder of the instant invention according to the method of Example 1.

The bricks were prepared from sand having 1.5 percent humidity and the binding solution prepared according to the methods of Example 1 or Example 2. 67 weight percent of sand was mixed with 33 weight percent of binding solution, based upon the total weight of the mixture. The binding solution and sand were intimately mixed by placing them through a runner (blender) for about 5 to about 7 minutes. The mixture was then compacted into a mould using a vibratory table having a cycle of 1000 to 1500 Hz and at a pressure in the range of 0.8–1.5 Kg/cm$^2$. The bricks were removed from the mould and cured in a microwave oven (850 watts) for 15 to 18 minutes.

The following results were obtained by subjecting the 9 samples to compression testing.

| Sample | Ball Mill MPa | Grinder MPa |
|---|---|---|
| 1 | 45.81 | 75.975 |
| 2 | 51.25 | 81.3 |
| 3 | 50.015 | 62.5 |
| 4 | 57.25 | 87.25 |
| 5 | 55.83 | 65.0 |
| 6 | 65.91 | 77.35 |
| 7 | 63.45 | 72.67 |
| 8 | 68.15 | 61.75 |
| 9 | 41.18 | 88.2 |

In a further test, additional blocks were prepared as described above from the binding solution of Examples 1 and 2. The bricks were tested for their pH, their compressive strength and their porosity. The results are set out in Table 1.

TABLE 1

| Run | Conentration of Orthosilicic Acid Sol (g/l) | pH | Limit of Compression (MPa) | Open Porosity (%) |
|---|---|---|---|---|
| 1 | 21.2 | 9.8–10.5 | 65.1–87.8 | 10.0–9.2 |
| 2 | 20.6 | 9.0–10–5 | 50.0–67.0 | 12.5–11.5 |

As can be seen from the foregoing, the binding solution used to prepare the bricks had approximately the same amount of orthosilicic acid sol. However, the ball mill requires at least 10 times longer to process the feedstocks as does the grinder of the instant invention. This leads to excessive wear of the ball mill and, in addition, the throughput of the grinder of the instant invention is over 10 times greater than that of the ball mill used in Example 2.

In addition to the foregoing, the strength of the product prepared according to the instant invention is substantially greater than that of the product produced utilizing the binding solution produced using the ball mill. The porosity of the product produced by the binding solution of the instant invention is also less than that compared to the brick prepared using the binding solution of Example 2.

EXAMPLE 4

Four building bricks comprising the binding solution prepared using the method of Example 1 and quartz sand filler were tested for water absorption according to CAN3-A82.8-R1984 which specifies a 5 hour boiling maximum of 22.0% and for a maximum saturation coefficient of 0.88.

| Sample | Water Absorption % | | |
|---|---|---|---|
| | 24 Hour Submersion | 6 Hour Boiling | Saturation Coefficient |
| 1 | 8.2 | 10.6 | 0.77 |
| 2 | 8.4 | 10.5 | 0.79 |
| 3 | 10.9 | 14.4 | 0.76 |
| 4 | 11.1 | 14.8 | 0.75 |

EXAMPLE 5

Two building bricks composed of the binding solution prepared using the method of Example 1 and quartz sand filler were tested for compressive strength according to CAN3-A82.2-R1984 which specifies 12.5 MPa.

| Sample | MPa | Over Specification |
|---|---|---|
| 1 | 63.3 | 5x |
| 2 | 37.3 | 3x |

EXAMPLE 6

Five bricks were prepared according to the method of Example 1. Each brick measured 5 cm by 5 cm by 5 cm. The bricks were tested for frost resistance according to test GOST 7025-78. According to this test, the bricks were repeatedly first exposed to air at a temperature of from about −15 to about −20° C. and subsequently defrosted by placing them in water at a temperature from about 15 to about 20° C. Repeated freeze/thaw cycles were conducted over a period of 4 hours. Frost resistance was determined by the amount of mass loss of samples after passing them through predetermined number of cycles. The results are set for in Table 2.

TABLE 2

| Run No. | Initial Weight (g) | Weight After 10 cycles (g) | Weight After 15 cycles (g) | Weight Loss After 10 cycles (%) | After 15 cycles of tests (%) |
|---|---|---|---|---|---|
| 1. | 253.65 | 253.05 | 252.09 | 0.2 | 0.3 |
| 2. | 255.57 | 255.15 | 255.07 | 0.1 | 0.2 |
| 3. | 254.72 | 254.23 | 254.20 | 0.2 | 0.2 |
| 4. | 259.20 | 258.72 | 258.62 | 0.2 | 0.2 |
| 5. | 254.45 | 254.02 | 253.90 | 0.2 | 0.2 |

As shown in Table 2, after repeated frost/thaw cycles, only insubstantial amounts of mass were lost. Accordingly, the sample cubes demonstrated good resistance to frost.

EXAMPLE 7

Two bricks having a size of 10 cm by 10 cm by 3 cm were prepared according to the method of Example 1. These two samples were test for heat conduction according to GOST 7076-87. The tests were performed on a "TSM" installation as recommended by GOST 8.326-78.

The results are set out in Table 3.

TABLE 3

| Run No. | T (°C.) | Humidity (%) | Thickness (mm) | Density (kg/m$^3$) | Size a × b | Conductivity of Heat (watts/m$^2$) |
|---|---|---|---|---|---|---|
| 1 | 32.5 | 0.0 | 33.1 | 2143 | 100 × 100 | 0.845 |
| 2 | 32.5 | 0.0 | 33.2 | 2145 | 100 × 100 | 0.895 |
| Average value | | | | 2144 | | 0.868 |

Table 4 demonstrates that bricks produced according to the instant invention have good thermal conductivity.

EXAMPLE 8

Four bricks were prepared according to the method of Example 1. Each of the bricks was tested according to test GOST 8462-85 to determine the durability of the bricks during compression and bending. Two of the bricks were tested for durability during bending and two were tested for durability during compression. The results are set out in Table 4.

TABLE 4

| Sample No. | Breaking Point During Bending (kgs/cm$^2$) | Breaking Point During Compression (kgs/cm$^2$) |
|---|---|---|
| 1. | 23.4 | 109 |
| 2. | 23.4 | 116 |

The bricks demonstrated good durability under both bending and compression.

It is claimed:

1. A binding solution comprising silicon dioxide fines, orthosilicic acid sol and water, a majority of said fines being generally spherical in shape, said orthosilicic acid sol surrounding said fines, said solution having an alkaline pH, said orthosilicic acid sol being present at a level of concentration of at least about 10 g/l, and said binding solution being substantially free of iron.

2. The binding solution as claimed in claim 1 wherein said pH varies from about 9.5 to about 11.

3. The binding solution as claimed in claim 1 wherein said pH varies from about 9.8 to about 10.5.

4. The binding solution as claimed in claim 1 wherein said concentration is greater than about 20 g/l.

5. The binding solution as claimed in claim 2 wherein a majority of said fines have a diameter less than about 0.30 mm.

6. The binding solution as claimed in claim 5 wherein a majority of said fines have a diameter less than about 0.17 mm.

7. A method for preparing the binding solution of claim 1, the method comprising subjecting a feedstock containing silicon dioxide to at least one shearing force in the presence of an aqueous alkaline medium containing free hydroxyl ions at an elevated temperature to produce silicon dioxide particles that are generally spherical in shape, said elevated temperature being at least about 55 degrees C.

8. The method as claimed in claim 7 wherein said shearing force comprises a shearing force to smooth the exterior surface of the silicon dioxide.

9. The method as claimed in claim 8 wherein said shearing force comprises two shearing forces to smooth the exterior surface of the silicon dioxide, the first shearing force being a tangential shearing force, and the second shearing force being substantially perpendicular to said tangential shearing force.

10. The method as claimed in claim 7 wherein the pH of said alkaline medium is from about 9.5 to about 11.

11. The method as claimed in claim 8 wherein the pH of said alkaline medium is from about 9.8 to about 10.5.

12. The method as claimed in claim 7 wherein said temperature is from about 60° to about 80° C.

13. The method as claimed in claim 7 wherein, when said feedstock containing silicon dioxide and said aqueous alkaline medium are first subjected to said shearing force, said feedstock and medium have a humidity of from about 20% to about 30%.

14. The method as claimed in claim 12 wherein said feedstock comprises more than about 75% silicon dioxide.

15. The method as claimed in claim 14 wherein said feedstock comprises more than about 85% silicon dioxide.

16. The method as claimed in claim 14 wherein said fines are generally spherical in shape and a majority of said fines have a diameter less than about 0.3 mm.

17. The method as claimed in claim 16 wherein a majority of said fines have a diameter less than about 0.17 mm.

18. The method as claimed in claim 7 wherein said binding solution comprises discrete particles of an orthosilicic acid sol surrounding silicon dioxide particles.

19. The method as claimed in claim 18 wherein the concentration of said orthosilicic acid sol is greater than about 10 g/l.

20. A ceramic product prepared by:
   (a) preparing a mixture of a filler and a binding solution comprising silicon dioxide fines, orthosilicic acid sol and water, a majority of said fines being generally spherical in shape, said orthosilicic acid sol surrounding said fines, said solution having an alkaline pH, said orthosilicic acid sol being present at a level of concentration of at least about 10 g/l, and said binding solution being substantially free of iron;
   (b) mixing said solution and said filler;
   (c) shaping said mixture; and
   (d) curing said mixture at an elevated temperature to remove water from said mixture, said curing being sufficient to bring the pH of said product within the range of between about 6 and about 7.5.

21. The ceramic product as claimed in claim 20 wherein the step of shaping said mixture comprises introducing said mixture into a mould.

22. The ceramic product as claimed in claim 21 wherein said mixture contains less than about 5 wt % water.

23. The ceramic product as claimed in claim 20 wherein said mixture comprises about 1.5 wt % water.

24. The ceramic product claimed in claim 22 wherein said mixture comprises from about 20 to about 35 wt % binding solution based on the weight of the filler.

25. The ceramic product as claimed in claim 22 wherein said mixture comprises up to about 50 wt. % binding solution based on the weight of said filler.

26. The ceramic product as claimed in claim 22 wherein said mixture is cured by subjecting said mixture to microwave energy.

27. The ceramic product as claimed in claim 25 wherein said mixture is compacted in a mould prior to curing step (d).

28. The ceramic product as claimed in claim 25 wherein said mould comprises the extruder port of an extruder.

29. A method of producing a ceramic product comprising:
   (a) preparing a mixture of a filler and a binding solution comprising silicon dioxide fines, orthosilicic acid sol and water, a majority of said fines being generally spherical in shape, said orthosilicic acid sol surrounding said fines, said solution having an alkaline pH, said orthosilicic acid sol being present at a level of concentration of at least about 10 g/l, and said binding solution being substantially free of iron;
   (b) shaping said mixture; and
   (c) curing said mixture at an elevated temperature to remove water from said mixture, and bringing the pH of said mixture to a substantially neutral level.

30. The method of producing a ceramic product as claimed in claim 29 wherein the step of shaping said mixture comprises introducing said mixture into a mould.

31. The method of producing a ceramic product as claimed in claim 30 wherein said mixture contains less than about 5 wt % water.

32. The method of producing a ceramic product as claimed in claim 31 wherein said mixture comprises about 1.5 wt % water.

33. The method of producing a ceramic product as claimed in claim 31 wherein said mixture comprises from about 20 to about 35 wt % binding solution based on the weight of the filler.

34. The method of producing a ceramic product as claimed in claim 31 wherein said mixture comprises up to about 50 wt % binding solution based on the weight of said filler.

35. The method of producing a ceramic product as claimed in claim 34 wherein said mould comprises the extruder port of an extruder.

36. The method of producing a ceramic product as claimed in claim 34 wherein mixture is cured by subjecting said mixture to microwave energy.

37. The method of producing a ceramic product as claimed in claim 34 wherein said mixture is compacted in said mould prior to curing step (d).

\* \* \* \* \*